United States Patent [19]
Ramharack et al.

[11] Patent Number: 5,536,759
[45] Date of Patent: Jul. 16, 1996

[54] RADIATION CURED HOT MELT PRESSURE SENSITIVE ADHESIVES FROM PHOTOINITIATOR-FUNCTIONALIZED, CROSSLINKABLE COPOLYMERS

[75] Inventors: Roopram Ramharack, Montgomery; Rama Chandran, South Bound Brook, both of N.J.

[73] Assignee: National Starch and Chemical Investment Holding Corporation, Wilmington, Del.

[21] Appl. No.: 322,257

[22] Filed: Oct. 13, 1994

Related U.S. Application Data

[62] Division of Ser. No. 217,574, Mar. 25, 1994, Pat. No. 5,391,406.

[51] Int. Cl.[6] .................. C09J 129/12; C09J 133/08; C09J 133/10; C08F 2/50
[52] U.S. Cl. .................. 522/35; 522/116; 522/126; 522/904; 522/149
[58] Field of Search ............... 522/35, 904, 149, 522/116, 157, 152, 174, 126, 162

[56] References Cited

U.S. PATENT DOCUMENTS

| | | | |
|---|---|---|---|
| 4,052,527 | 10/1977 | Pastor et al. | 428/463 |
| 4,151,055 | 4/1979 | Stueben et al. | 204/159.15 |
| 4,165,266 | 8/1979 | Stueben et al. | 204/159.15 |
| 4,181,752 | 1/1980 | Martens et al. | 427/54.1 |
| 4,234,662 | 11/1980 | Pastor et al. | 428/500 |
| 4,714,655 | 12/1987 | Bordoloi et al. | 428/345 |
| 4,761,435 | 8/1988 | Murphy et al. | 522/46 |
| 4,769,419 | 9/1988 | Dawdy | 525/111 |
| 4,904,737 | 2/1990 | Sato et al. | 525/286 |
| 4,920,157 | 4/1990 | Schulz et al. | 522/96 |
| 5,087,686 | 2/1992 | Ansell et al. | 528/49 |
| 5,128,386 | 7/1992 | Rehmer et al. | 522/35 |
| 5,130,369 | 7/1992 | Hughes et al. | 524/846 |
| 5,149,586 | 9/1992 | Ishiwata et al. | 428/345 |
| 5,384,341 | 1/1995 | Itagaki et al. | 522/149 |
| 5,416,127 | 5/1995 | Chandran et al. | 522/149 |

OTHER PUBLICATIONS

Journal of Coatings Technology, reprint entitled *m–TMI, A Novel Unsaturated Aliphatic Isocyanate*, by Dexter, Saxon and Fiori of American Cyanamid Company, Sep. 1985.

*Primary Examiner*—Susan W. Berman
*Attorney, Agent, or Firm*—Jane E. Gennaro

[57] ABSTRACT

This invention is a hot melt pressure sensitive adhesive formed by copolymerizing acrylic, or a combination of acrylic and vinyl, monomers, at least one of which is a photoinitiator, with the functional monomer, 1-(1-isocyanato-1-methyl ethyl)-3-(1-methyl ethenyl)benzene (m-TMI), to give a saturated polymer with pendant vinyl groups that are crosslinked by UV radiation.

8 Claims, No Drawings

RADIATION CURED HOT MELT PRESSURE SENSITIVE ADHESIVES FROM PHOTOINITIATOR-FUNCTIONALIZED, CROSSLINKABLE COPOLYMERS

This application is a division of application Ser. No. 08/217,574, filed Mar. 25, 1994, now U.S. Pat. No. 5,391,406.

FIELD OF THE INVENTION

This invention relates to acrylic-based hot melt pressure sensitive adhesives that are cured by actinic radiation.

BACKGROUND OF THE INVENTION

Hot melt pressure sensitive adhesives are compositions that combine the properties of hot melt adhesives with the properties of pressure sensitive adhesives. The hot melts are solids at room temperature, melt upon application of heat, and regain their solid form on cooling. The pressure sensitives are aggressive and permanently tacky at room temperature, and adhere to surfaces by the application of light finger pressure. The combination of these properties provide compositions that melt at elevated temperatures and cool to form a permanently tacky solid coating that adheres on contact. These compositions are most commonly applied to various substrates, such as paper, cloth, metal, and plastic films, which are then converted into tapes and labels for use in the packaging industry, particularly in marking, sealing and bonding applications, or for use in the health and pharmaceutical industry, particularly in bandages or transdermal drug delivery systems.

A good workable hot melt pressure sensitive adhesive must exhibit high cohesive strength at room temperature, low shrinkage on substrates (particularly flexible plastic), retention of pressure sensitive properties during storage and use, and a relatively fluid viscosity at commonly employed application temperatures of 80°–180° C. Although very low molecular weight polymers will yield a hot melt with sufficient fluidity, the resulting adhesives lack cohesive strength. High molecular weight polymers give better cohesive strength, but are too viscous at the common application temperatures to be easily coatable on substrates and must be extended with a high proportion of low molecular weight oils or resins to reduce the viscosity. The addition of low molecular weight oils or resins in turn detracts from the cohesive strength and heat resistance.

To circumvent these problems, low molecular weight polymers have been made with olefinic unsaturation on side chains. The olefinic unsaturation can then be crosslinked by ultra-violet or other actinic radiation to provide sufficient cohesion and tack. Ordinarily, most of the olefinic double bonds that polymerize by free radical reactions are also thermally polymerizable. In this regard, it is known that acrylates, methacrylates, styrenes, vinyl ester, and allyl compounds, for example, are quite susceptible to thermally induced polymerization (see, Principles of Polymerization, Second Edition, George Odian, John Wiley & Sons (1981), page 214). A hot melt adhesive, which is a 100% solid composition, must be heated to temperatures in the range of 80°–180° C. in order to realize a sufficient viscosity for the proper processing and coating of the polymer. When hot melt pressure sensitive adhesives with pendant unsaturation encounter high processing temperatures for long periods of time, the pendant unsaturation begins to crosslink and the adhesives exhibit an increase in viscosity and may gel before they can be irradiated.

For example, U.S. Pat. No. 4,234,662, issued 18 Nov. 1980 to Pastor et. al., teaches a hot melt pressure sensitive adhesive prepared by introducing a predetermined amount of pendant vinyl unsaturation into a saturated polymeric chain that is the base for the adhesive. In the method disclosed in this patent, allyl acrylate or methacrylate is copolymerized with an acrylic monomer and reliance is placed on the difference in reactivity between the acrylic double bond and the allylic double bond to control the level of polymerization, and ultimately, the level of crosslinking. However, in commercial practice, this differential is not sufficient and large scale production frequently leads to excessive polymerization and premature gelation.

U.S. Pat. No. 4,665,106, issued 12 May 1987 to Ohta et al., teaches a radiation curable pressure sensitive adhesive. This adhesive is not a hot melt, but does comprise low molecular weight oligomers prepared by introducing one or more olefinic unsaturated bonds into side chains of the adhesive polymer. The process comprises copolymerizing an acrylic ester compound with a monomer having a carboxyl, hydroxyl, epoxy, or amine functional group, and then reacting that functional group in a non-free radical reaction with another monomer having one or more unsaturated double bonds. Although it could be assumed that this method would eliminate premature gelation during polymerization that may be caused by the presence of allyl groups, nevertheless, excessive crosslinking would still appear to be a problem addressed by the addition of large amounts of chain transfer agents to the adhesive syrup.

Therefore, there is a need for a hot melt pressure sensitive adhesive that has good cohesive and adhesive properties and that will remain thermally stable during processing and coating operations, but at the same time, will be easily cured by actinic radiation after processing or coating onto a substrate.

SUMMARY OF THE INVENTION

This invention is a process for the preparation of a radiation cured, hot melt, pressure sensitive adhesive that is a viscoelastic solid at room temperature, that is fluid and thermally stable at commonly employed industrial application temperatures, and that crosslinks upon exposure to UV radiation to provide pressure sensitivity. The process comprises preparing a saturated polymeric chain that has both pendant unsaturation and pendant photoinitiator functionality from acrylic monomers, or a combination of acrylic and vinyl monomers, at least one of which also has photoinitiator functionality, and crosslinking the pendant vinyl unsaturation by irradiation to provide the required pressure sensitivity. The pendant unsaturation is introduced by the incorporation of 1-(1-isocyanato-1-methyl ethyl)-3-(1-methyl ethenyl)benzene (m-TMI) in a separate condensation reaction after the initial polymerization, which avoids any problem of premature gelation of the adhesive during polymerization. It has been found that the use of m-TMI to add the pendant unsaturation, in comparison to other olefinic compounds for crosslinking, provides a polymer having pendant vinyl groups that are stable to thermally induced crosslinking at temperatures up to 180° C., and thus eliminates any thermally induced crosslinking during processing or coating operations.

The process comprises the steps of: (a) copolymerizing (i) 100 parts by weight acrylic, or a combination of acrylic and vinyl, monomers, with (ii) 0.1 to 20 parts by weight of at least one acrylic or vinyl monomer that also contains a functional group, such as, a hydroxyl, amine, carboxyl or amide group, that is unreactive in a free radical polymerization, and (iii) 0.1 to 10 parts by weight of at least one acrylic or vinyl monomer that also contains photoinitiator functionality, the monomers chosen to result in a polymer that is a viscoelastic solid at ambient temperature, has a glass transition temperature (Tg) in the range of −60° C. to +5° C., preferably −50° C. to −5° C., and has a Brookfield viscosity in the range of 500,000 to 1,000 mPa.s (cps) at temperatures in the range of 80° C. to 180° C.; (b) reacting the hydroxyl, amine, carboxyl or amide functional group on the resultant polymer with 1-(1-isocyanato-1-methyl ethyl)-3-(1-methyl ethenyl)benzene (m-TMI) in a condensation reaction to introduce pendant vinyl groups onto the polymer; and (c) exposing the polymer to ultraviolet radiation sufficient to crosslink the pendant vinyl groups and provide a pressure sensitive adhesive.

In another embodiment, this invention is a process for preparing a hot melt pressure sensitive adhesive on a substrate that additionally incorporates the steps of heating the resultant polymeric solid to a temperature in the range of 80° C. to 180° C. to render the solid fluid and coatable, and coating the fluid polymer onto a substrate before irradiation.

In other embodiments, this invention is a radiation curable hot melt adhesive that achieves higher cohesion (pressure sensitivity) on irradiation with UV radiation, the radiation cured hot melt pressure sensitive adhesive, and the radiation cured hot melt pressure sensitive adhesive on a substrate.

DETAILED DESCRIPTION OF THE INVENTION

The choice and relative amounts of the specific acrylic and vinyl monomers making up the polymeric base for the hot melt pressure sensitive adhesives of this invention are dependent upon the desired final properties and contemplated end uses of the adhesives. The choice of which acrylic and vinyl monomers and their relative amounts in the final composition to achieve the desired properties are within the expertise of those skilled in the art.

Acrylic monomers that may be used include α,β-unsaturated mono- and dicarboxylic acids having 3–5 carbon atoms, acrylate ester monomers selected from the group consisting of the alkyl esters of acrylic and methacrylic acid in which the alkyl groups contain 4 to 14 carbon atoms, preferably 4 to 8 carbon atoms. Specific examples are n-butyl acrylate, n-pentyl acrylate, n-hexyl acrylate, n-heptyl acrylate, n-octyl acrylate, n-nonyl acrylate, and their corresponding branched isomers, such as, 2-ethylhexyl acrylate.

Vinyl monomers that may be used in combination with the acrylic monomers include vinyl esters, vinyl ethers, vinyl halides, vinylidene halides, and nitriles of ethylenically unsaturated hydrocarbons. Specific examples include vinyl acetate, N-vinyl formamide, vinyl pyridine, acrylamide, t-octyl acrylamide, acrylic acid, ethyl vinyl ether, vinyl chloride, vinylidene chloride, acrylo-nitrile, maleic anhydride and styrene.

In addition, other acrylate monomers, such as methyl acrylate and methyl methacrylate, which are not considered tacky or pressure sensitive, may be used in combination with those acrylic, or acrylic and vinyl, monomers known to have pressure sensitivity, in amounts such that the monomers known to impart pressure sensitivity will constitute at least about 50% by weight of the total copolymer. The acrylic or vinyl monomers that ultimately will react with m-TMI will contain hydroxyl, amine, carboxyl or amide groups. Examples of such monomers are 2-hydroxyethyl acrylate, 2-hydroxypropyl acrylate, 4-hydroxybutyl acrylate, and their corresponding methacrylates; acrylic acid and methacrylic acid; t-butyl-aminoethylmethacrylate, acrylamide and methacrylamide; and allyl alcohol. The preferred monomers are the hydroxyalkyl acylates and methacrylates; the more preferred are 2-hydroxypropyl acrylate and 2-hydroxypropyl methacryalte. In general, the functional olefinic monomer will be present in an amount from 0.1% to 20% by weight of the polymer, or 0.1 to 25 parts per hundred parts of the acrylic and vinyl monomers not containing the additional functional groups.

Optionally, additional functionalities that do not react with the isocyanate, such as, N-substituted amides, tertiary amines, or lactams, may be introduced into the polymer by copolymerization with appropriate monomers to provide enhanced adhesive properties. Examples of such monomers are N-vinyl formamide, N-vinyl pyrrolidone, and 4-vinyl pyridine. When these functionalities are used, they are typically used in amounts up to 5% by weight of the polymer (5 parts per hundred parts of monomer).

Any acrylic or vinyl monomer containing photoinitiator functionality may be used in the polymerization to introduce photoinitiator functionality into the polymer chain. The preferred photoinitiator functionality is a 4-hydroxy-benzophenone radical, or its derivatives, represented by the structure:

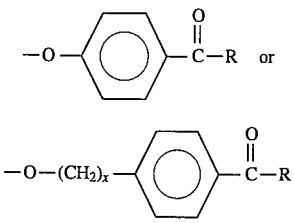

where
x is 0 to 2,
R is

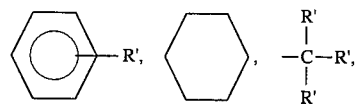

and
R' is H or CH$_3$.

The preferred monomer for this purpose is an acrylate prepared in a Schotten-Baumann type reaction from 2-hydroxy-1-[4-(2-hydroxyethoxy)-phenyl]-2-methyl- 1-propanone, commercially available from Ciba-Geigy Corporation under the tradename Darocure®2950, with acryloyl chloride (acid-chloride, alcohol reaction with an acid scavenger). The amount of photoinitiator monomer included in the polymerization will be a sufficient amount to initiate free radical crosslinking with the pendant double bond. In general, this amount will be from about 0.1 to 0.5 millimoles per gram of polymer (0.1 to 10 parts, preferably 0.25 to 1.5 parts, per hundred parts of the acrylic and vinyl monomers). Photoinitiator functionality, as used herein, means those compounds that when activated by UV light are able to start the polymerization of a monomer.

Suitable photoactivators, as known in the art, may also be used in combination with photoinitiators, and include hindered amines, aldehydes, and anthroquinone. When used, the photoactivators are employed in the known effective amounts.

As known by those skilled in the art, the preparation of the unsaturated polymeric base containing the functional group and the pendant photoinitiator can be carried out by solution, emulsion, or bulk polymerization procedures using well-known polymerization techniques, such as free radial, anionic, and cationic techniques. The polymer can then be formed into a hot melt by removal of the solvent, coagulation of the latex, or melt-processing of the neat polymer.

After the polymerization is complete, the functionality on the polymer chain is reacted in a condensation reaction with m-TMI to incorporate the pendant unsaturation. The amount of m-TMI for ultimate irradiation crosslinking that is incorporated into the polymeric chain will be a sufficient amount to provide crosslinking to result in an excellent balance of tack, peel adhesion, and cohesive strength for the end use contemplated. This amount will be dependent on the polymeric composition, as well as the source of radiation, the amount of radiation received, the production line speed, and the thickness of the adhesive coating on the substrate. In general, this amount will be in the range of 0.01 to 15 weight % of the polymer, or 0.01 to 18 parts per hundred parts of the acrylic an vinyl monomers.

The adhesive polymer may also comprise various other additives, such as plasticizers, tackifiers, and fillers, all of which are conventionally used in the preparation of hot melts and pressure sensitive adhesives.

The composition is irradiated by ultraviolet (UV) radiation having a wavelength within the range of 1800–4000 A, preferably 2000–3500 A, in air or nitrogen atmospheres. Irradiation may be done immediately while the composition is still a melt or at room temperature.

The irradiation is done for a period of time sufficient to transform the low cohesive material into an elastomeric adhesive of higher plasticity. The exact length of exposure will be dependent upon the nature and intensity of the radiation, the amount of m-TMI incorporated, the polymeric system, the thickness of the adhesive film, environmental factors, and the distance between the radiation source and the adhesive film.

The actual radiation used can be actinic light from any source, provided it furnishes an effective amount of ultraviolet radiation, since the compositions of the invention activatable by actinic light will generally exhibit their maximum sensitivity to wavelengths in the ultraviolet range. Suitable sources of radiation are carbon arcs, mercury-vapor arcs, fluorescent lamps with special ultraviolet light emitting phosphorus, electronic flash lamps and the like, or lasers of specific wave lengths, and combinations of those. Preferred lamps are the electrodeless microwave powered lamps from Fusion Systems, Rockland, Md., or arc lamps from EYE UV, Wilmington, Mass.

The distance between the radiation source and adhesive on the coated substrate may range from about 0.32 cm to 25.4 cm (⅛th to 10 inches), and preferably is from 0.32 cm to 17.8 cm (⅛th to 7 inches).

In most pressure sensitive uses, the hot melt composition is applied to a backing or substrate before irradiation. When formulating the exact composition for adhesives that will be coated, the components are chosen preferably to provide a hot melt composition that only need be heated to a temperature above 80° C. to render the composition fluid and coatable for the time required for application to the substrate. Commonly used industrial temperatures are in the range of 800° to 180° C., and usually in the range 120°–180° C. Typically, the hot melt pressure sensitive adhesives of this invention have melt viscosities between about 500,000–1,000 mPa.s (cps), preferably between about 25,000–2,000 mPa.s (cps) at those application temperatures.

Application of the hot melt may be accomplished using any conventional means, such as, roller, slot orifice, spray or extrusion coating. The substrate can be in the form of films, tapes, sheets, panels, and the like, and can be made of materials such as paper, fabric, plastic, nonwoven fibers, metal, foil, natural rubber, synthetic rubber, wood and plywood. If a coated substrate is to be used in the form of a roll, the back of the substrate is usually coated with a release backsize to prevent the adhesive from adhering to the reverse side of the substrate. If a substrate is to be coated on both sides and rolled, a strippable paper or other protective means is laid over the adhesive on one side to prevent that adhesive from adhering to the adhesive on the other. In some uses, a second substrate may be applied directly to the adhesive.

A pressure sensitive adhesive film may be formed by applying the hot melt to a release material, such as silicone coated paper, and then after irradiation, the adhesive may be stripped from the release material and used as a film.

EXAMPLES

These examples show the preparation and performance of hot melt pressure sensitive adhesives incorporating both photoinitiator and crosslinking functionality onto the polymeric base. The base polymer was prepared in a free radical polymerization according to the procedure below with varying levels of photoinitiator monomer and was then reacted in a condensation reaction with different levels of m-TMI to introduce the crosslinking (pendant vinyl) functionality. The resulting polymers were heated to 180° C. and applied to a substrate. They were then irradiated with UV to impart pressure sensitivity and tested for peel adhesion and shear adhesion. All parts are given in parts by weight.

Preparation of base polymer

Three base polymers containing three different levels of photoinitator monomer were prepared by solution polymerization. Each of the base polymers comprised by weight a mixture of acrylates in the ratio of 50 parts ethylhexyl acrylate, 35 parts methyl acrylate, and 10 parts butyl acrylate, polymerized with 5 parts 2-hydroxyethyl acrylate. Mercaptoethanol at 0.1 part was added as chain transfer agent. The photoinitiator monomer was prepared from 2-hydroxy-1-[4-(2-hydroxyethoxy)phenyl]-2-methyl-1-propanone and acryloyl chloride as recited above in nearly quantitative yield. The monomer was determined to be pure by NMR and was incorporated at levels of 0.11, 0.25 and 0.50 mmol/g polymer, corresponding to 0.3, 0.7 and 1.4 weight % [parts per hundred parts monomer (pphm)], respectively. The reagents and procedure were the following:

|  | pphm | Weight (grams) |
|---|---|---|
| Monomer Mix |  |  |
| 2-Ethylhexyl acrylate (2-EHA) | 50 | 500.00 |
| Methyl acrylate (MAc) | 35 | 350.00 |
| Butyl acrylate (BA) | 10 | 100.00 |
| 2-Hydroxyethyl acrylate (2-HEA) | 5 | 50.00 |
| Photoinitiator acrylate | 1.38 | 13.8 |
|  | (0.69) | (6.9) |

-continued

|  | pphm | Weight (grams) |
|---|---|---|
| Mercaptoethanol (2-ME) | (0.3)<br>0.1 | (3.0)<br>1.0 |
| Initial Charge | | |
| Monomer mix | | 100.10 |
| Ethyl acetate | 16 | 160.00 |
| 2,2'-Azo-bis-<br>(2-methylbutanenitrile)<br>(initiator Vazo 67 from Du Pont) | 0.1 | 1.00 |
| Monomer Slow Add | | |
| Monomer mix | | 900.90 |
| Initiator Slow Add | | |
| Ethyl acetate | 12 | 120.00 |
| 2,2'-Azo-bis(2-methyl-<br>butanenitrile) | 1 | 10.00 |
| Scavenger Slow Add | | |
| Ethyl acetate | 4 | 40.00 |
| t-Amylperoxypivalate<br>(Lupersol 554,M50 from Atochem) | 0.9 | 9.00 |
| Total Weight | | 1341.00 |
| Theoretical Solids | | 75.80 |

The initial charge was heated to reflux and held for ten minutes. While maintaining reflux, addition of the remaining monomer mix was started and continued over two hours; simultaneously, the addition of the initiator was started and continued over three hours. At the completion of the initiator addition the reaction was held at reflux for an additional three hours. The scavenger catalyst was then added over one hour and the reaction mix was held at reflux for two hours after addition was completed. The contents were cooled to 25° C. (At this point the contents were analyzed for residual 2-EHA. If residual 2-EHA is greater than 0.1%, additional scavenger is added in an amount of 0.9 pphm and the reaction held for an additional hour.) The resulting solution had a solids content of 74–76%; intrinsic viscosity (in toluene) of 0.396; Mw of approximately $1.23 \times 10^5$; Mn of approximately $1.93 \times 10^4$.

Addition of crosslinking functionality to the base polymer

The three base polymers were divided into samples and reacted in separate condensation reactions with 0.15 millimoles and 0.30 millimoles m-TMI per gram of polymer, corresponding to 3.0 and 6.0 wt % (pphm). The reaction was conducted under anhydrous conditions with the use of a $CaCl_2$ drying tube attached to the condenser and the apparatus was sealed to hold 20 mm vacuum. The water content of the polymer solution was checked by Karl Fischer titration and confirmed to be below 0.1%. The isocyanate was added to the polymer solution and stirred for ten minutes at 30° C. The catalyst dibutyl tin dilaurate (0.001 mmol/g of polymer) was added and the reaction mix stirred for 10 minutes. The mixture was warmed to 50° C., held for three hours, and then cooled to room temperature. A film IR was run at several points in the reaction to check for the disappearance of the isocyanate band at 2230–2150 $cm^{-1}$ to determine complete reaction. When the reaction was complete, the solvent was stripped under reduced pressure (10–30 mm Hg) at 95° C. and the reaction product discharged at approximately 80°–90° C.

Application to substrate and Irradiation of samples

Each of the resulting nine samples was heated to 180° C. and applied at varying coating thicknesses to a 2 mil (1 mil=25 microns) thick polyethylene terephthalate substrate (Mylar®, a product of DuPont). Each of the samples on substrate was then irradiated with UV radiation at varying line speeds. UV radiation was supplied by a D lamp (available from Fusion Systems) at 600 watts at production line speeds of 40 or 50 feet per minute.

EXAMPLE I

Tests for Adhesive Properties

Each of the samples was tested for peel adhesion at 180° angle and shear adhesion according to the following test methods for pressure sensitive tapes developed by the Specifications and Technical Committee of the Pressure Sensitive Tape Council (PSTC).

Peel Adhesion 180° Test (PSTC-1)

This test measures the force required to remove a pressure-sensitive tape from a stainless steel panel at a 180° angle at a speed of 12 inch/minute. The tape, poly(ethylene terephthalate) substrate and the sample adhesives at various coating thicknesses, is prepared to size (1 inch×6 inch×1.5 mils) and rolled onto the stainless steel panel. An end of the tape is pulled back at 180° angle at a rate of pull of 12 inches per minute by an Instron Tensile Tester, and the force necessary to effect delamination is recorded in ounces per inch width of tape. Tests were taken at 20 minutes and 24 hours after application to the stainless steel panel.

Shear Adhesion Test (PSTC-7)

This test measures the shear strength of a pressure sensitive tape to remain adhered under load applied parallel to the surfaces of the tape. The coated sample is prepared to size (6 inch×0.5 inch) and is applied to a vertical standard stainless steel panel with a 0.5 inch overlap joint. A mass of 1000 grams is suspended from the sample and the time until failure is measured. The test is carried out at 23° C. and 50% relative humidity.

The results are set out in the Table I and show that the hot melt pressure sensitive adhesives containing both photoinitiator functionality and pendant vinyl functionality give superior performance results.

TABLE I

Performance Test Results of UV Cured Adhesive with Incorporated Photoinitiator

| Sample | % Photoinitiator Monomer | m-TMI (Wt. %) | Coating Weight (mil) | Line Speed (fpm) | Cure Method | 20 min (oz/in) | 24 hrs. (oz/in) | 4 psi (hr, min) |
|---|---|---|---|---|---|---|---|---|
| A | 0.3 | 0 | 1.2 | | control, uncured | 47 c f | 42 c f | 1.2 min c f |
| | | | 1.2 | 40 | thru 2 mil mylar | 46 c f | 42 c f | 1.3 min, c f |
| | | | 1.2 | 50 | direct exposure | 60 c f | 67 c f | 2 min, c f |

TABLE I-continued

Performance Test Results of UV Cured Adhesive with Incorporated Photoinitiator

| Sample | % Photoinitiator Monomer | m-TMI (Wt. %) | Coating Weight (mil) | Line Speed (fpm) | Cure Method | 20 min (oz/in) | 24 hrs. (oz/in) | 4 psi (hr, min) |
|---|---|---|---|---|---|---|---|---|
| B | 0.3 | 3 | 1 |    | uncured | 64 c f | 57 c f | 1.8 min, c f |
|   |     |   | 1 | 40 | direct exposure | 98 c f | 98 c f | 2 hr, c f |
|   |     |   | 1 | 50 | direct exposure | 96 c f | 93 c f | 4.3 hr, c f |
|   |     |   | 1.2* | 40 | thru 1/2 mil mylar | 75 c f | 76 c f | 33 min, c f |
| C | 0.3 | 6 | 1 |    | uncured | 74 c f | 68 c f | 1.8 min, c f |
|   |     |   | 1 | 40 | direct exposure | 65 a f | 89 c f | 33 hr, c f |
|   |     |   | 1.1 | 50 | direct exposure | 99 c f | 103 c f | 57.3 min, c f |
| D | 0.69 | 0 | 1 |    | control, uncured | 53 c f | 44 c f | 1.6 min, c f |
|   |      |   | 1 | 40 | direct exposure | 91 c f | 92 c f | 7.2 hr, c f |
|   |      |   | 1 | 50 | direct exposure | 88 c f | 90 c f | 1.4 hr, c f |
| E | 0.69 | 3 | 1 |    | uncured | 68 c f | 62 c f | 1.8 min, c f |
|   |      |   | 1 | 40 | direct exposure | 46 a f | 74 a f | 2.1 hr, c f |
|   |      |   | 1 | 50 | direct exposure | 86 a f | 59 a f | 46 hr, a f |
|   |      |   | 1.3* | 40 | thru 1/2 mil mylar | 29 a f | 35 a f | 11 hr, c f |
| F | 1.38 | 0 | 1 |    | control uncured | 56 c f | 53 c f | 2 min, c f |
|   |      |   | 1 | 40 | direct exposure | 56 a f | 59 a f | 2.9 hr, c f |
|   |      |   | 1 | 50 | direct exposure | 93 a f | 68 c f | 16 hr, a f |
| G | 1.38 | 3 | 1 |    | uncured | 72 c f | 64 c f | no data |
|   |      |   | 1* |   | uncured | 66 c f | 64 c f | no data |
|   |      |   | 1 | 40 | direct exposure | 27 a f | 31 a f | 6.3 hr, a f |
|   |      |   | 1 | 50 | direct exposure | 25 a f | 36 a f | 4.8 hr, a f |
|   |      |   | 1* | 40 | thru 1/2 mil mylar | 17 a f | 21 a f | 25 hr, a f |
| H | 1.38 | 6 | 1 |    | uncured | 83 c f | 82 c f | no data |
|   |      |   | 1 | 40 | direct exposure | 39 a f | 44 a f | 11 hr, c f |
|   |      |   | 1 | 50 | direct exposure | 50 a f | 54 a f | 30 hr, a f |

Note: *Coated on 1/2 mil mylar.

EXAMPLE II

Thermal Stability as a Function of Time

Two additional base polymers were prepared to test the thermal stability of the pendant unsaturation incorporated by the addition of the m-TMI moiety to the polymeric chain. The first base polymer containing 0.43 mmol hydroxyl functionality per gram of polymer was prepared according to the procedure recited above with the exception that the photoinitiator functionality was omitted. A second base polymer was prepared according to the same procedure as the first polymer with the additional exception that 4.2 parts of maleic anhydride was substituted for the 5 parts of 2-hydroxyethyl acrylate to give 0.43 mmol anhydride functionality per gram of polymer.

The first base polymer was divided into four samples. One sample was held as the control with no olefinic unsaturation incorporated. Three of the samples were reacted in separate condensation reactions with 0.175 millimoles of m-TMI, maleic anhydride, and allyl isocyanate per gram of base polymer. The second base polymer was functionalized with 0.175 millimoles of 3-aminopropylvinyl ether per gram of polymer.

The control and each of the samples were held for two hours at elevated temperatures and observed for gelation, an indication of thermally induced crosslinking. The results are set out in Table II and show that the unsaturation from the alpha-methyl styrene moiety of m-TMI is more thermally stable than the unsaturation introduced from the other olefinic sources.

TABLE II

Brookfield Viscosity (mPa.s) as a Function of Time

| Sample | Temp. °C. | 1 Hour | 2 Hours |
|---|---|---|---|
| Control | 180 | 4000 | 4000 |
| K. α-methyl styrene | 180 | 4800 | 7000 |
| L. maleic anhydride | 150 | gel | gel |
| M. 3-aminopropyl-vinyl ether | 38 | gel | gel |
| N. allyl isocyanate | 180 | 6000 | gel |

EXAMPLE III

Viscosity Stability as a Function of 1° or 2° Hydroxyls

A series of polymers was prepared as described above both without and with the incorporation of 3.1 weight % m-TMI and varying the source of hydroxyl functionality from hydroxy ethyl acrylate or methacrylate to hydroxy propyl acrylate or methacrylate. The polymers were then tested for viscosity stability. The composition of the polymers and the viscosity data over time are recorded in Table III. The results show that it is the incorporation of the pendant double bonds and not the photoinitiator that affects stability as measured by viscosity, and that the stability is better using hydroxypropyl acrylate or methyacrylate compared to hydroxyethyl acrylate or methacrylate.

TABLE III

| Sample Composition | Temp (°C.) | Viscosity Profile | | | | | |
|---|---|---|---|---|---|---|---|
| | | 0 min mPa.s | 10 min mPa.s | 20 min mPa.s | 30 min mPa.s | 45 min mPa.s | 60 min mPa.s |
| HPMA + 2-ME | 121 | 36,000 | 34,000 | 32,000 | 31,200 | 31,200 | 31,200 |
| " | 150 | 12,600 | 11,600 | 11,600 | 11,400 | 11,400 | 11,400 |
| " | 176.6 | 6,100 | 5,500 | 5,100 | 5,000 | 5,000 | 5,000 |
| " | 205 | 3,000 | 2,800 | 2,400 | 2,400 | 2,400 | 2,400 |
| HPMA | 121 | 40,000 | 34,000 | 32,000 | 31,600 | 31,600 | 31,600 |
| " | 150 | 14,500 | 11,750 | 10,600 | 10,500 | 10,500 | 10,500 |
| " | 176.6 | 5,500 | 5,000 | 4,600 | 4,600 | 4,600 | 4,600 |
| " | 205 | 2,700 | 2,300 | 2,000 | 1,900 | 1,900 | 1,900 |
| HPA | 121 | 32,500 | 28,500 | 27,500 | 27,100 | 27,000 | 26,600 |
| " | 150 | 10,500 | 10,000 | 9,500 | 9,500 | 9,500 | 9,500 |
| " | 176.6 | 5,000 | 4,500 | 4,300 | 4,300 | 4,300 | 4,300 |
| " | 205 | 2,700 | 2,300 | 2,000 | 1,900 | 1,900 | 1,900 |
| HEA | 121 | 21,400 | 20,150 | 20,150 | 20,150 | 20,150 | 20,150 |
| " | 150 | 8,500 | 8,150 | 8,150 | 8,150 | 8,150 | 8,150 |
| " | 176.6 | 4,500 | 4,150 | 4,150 | 4,100 | 4,100 | 4,100 |
| " | 205 | 2,500 | 2,100 | 1,900 | 1,900 | 1,900 | 1,900 |
| HPMA + 2-ME | 121 | 45,000 | 31,000 | 26,500 | 26,200 | 26,200 | 26,200 |
| " | 150 | 12,000 | 10,800 | 10,300 | 10,200 | 10,200 | 10,200 |
| " | 176.6 | 6,000 | 5,600 | 5,600 | 5,600 | 5,600 | 5,600 |
| " | 205 | 3,700 | 4,000 | 5,000 | 6,200 | 8,400 | 12,000 |
| HPMA + m-TMI | 150 | 15,000 | 13,200 | 12,600 | 12,000 | 12,000 | 12,000 |
| " | 176.6 | 7,000 | 6,300 | 6,400 | 6,500 | 6,800 | 7,200 |
| " | 205 | 4,500 | 5,000 | 5,700 | 6,500 | 7,700 | 9,000 |
| HPA + m-TMI | 150 | 10,000 | 8,000 | 7,900 | 7,900 | 7,900 | 7,900 |
| " | 176.6 | 4,800 | 4,700 | 5.200 | 5,600 | 6,200 | 7,000 |
| " | 205 | 5,600 | 7,000 | 12,000 | 20,000 | GEL | GEL |
| HPA + m-TMI | 150 | 18,000 | 14,200 | 14,100 | 14,000 | 14,000 | 14,000 |
| " | 176.6 | 7,000 | 8,200 | 8,500 | 9,200 | 12,000 | 20,000 |
| " | 205 | GEL | GEL | GEL | GEL | GEL | GEL |

We claim:

1. A radiation curable hot melt adhesive that achieves pressure sensitivity on irradiation, made by a process that comprises the steps of:
   (a) copolymerizing
      (i) 100 parts by weight acrylic monomers, or a combination of acrylic and vinyl monomers, with
      (ii) 0.15 to 18 parts of at least one acrylic or vinyl monomer that also contains a functional group selected from the group consisting of hydroxyl, amine, carboxyl and amide group, and
      (iii) 0.1 to 10 parts of at least one acrylic or vinyl monomer that also contains photoinitiator functionality,
   the monomers chosen to result in a copolymer that is a viscoelastic solid at ambient temperature, has a glass transition temperature (Tg) in the range of −60° C. to +5° C., and that has pendant photoinitiator functionality;
   (b) reacting the functional group on the copolymer with 1-(1-isocyanato-1-methyl ethyl)-3-(1-methyl ethenyl)benzene (m-TMI) in a condensation reaction to provide a copolymer having both pendant photoinitiator functionality and pendant vinyl groups,
   the copolymer characterized in that it has a Brookfield viscosity in the range of 500,000 to 1,000 mPa.s at temperatures in the range of 80° C. to 180° C. and when exposed to ultraviolet light sufficient to crosslink the pendant vinyl groups provides a pressure sensitive adhesive.

2. The adhesive according to claim 1 in which the acrylate monomers are selected from the group consisting of n-butyl acrylate, n-pentyl acrylate, n-hexyl acrylate, n-heptyl acrylate, n-octyl acrylate, n-nonyl acrylate, and their corresponding branched isomers.

3. The adhesive according to claim 1 in which the vinyl monomers are selected from the group consisting of vinyl acetate, acrylamide, t-octyl acrylamide, acrylic acid, vinyl ethyl ether, vinyl chloride, vinylidene chloride, acrylonitrile, maleic anhydride and styrene.

4. The adhesive according to claim 1 in which the m-TMI is reacted with the copolymer of step (a) in an amount of 0.1% to 15% by weight of the polymer.

5. The adhesive according to claim 1 in which the acrylic or vinyl monomer that contains an additional functional group is selected from the group consisting of 2-hydroxyethyl acrylate, 2-hydroxypropyl acrylate, 4-hydroxybutyl acrylate, 2-hydroxyethyl methacrylate, 2-hydroxypropyl methacrylate, 4-hydroxy-butyl methacrylate, acrylic acid, methacrylic acid, t-butyl-aminoethyl-methacrylate, acrylamide, methacrylamide, and allyl alcohol.

6. The adhesive according to claim 5 in which the acrylic or vinyl monomer that contains an additional functional group is 2-hydroxypropyl acrylate or 2-hydroxypropyl methacrylate, present in an amount of 0.1 to 20% by weight.

7. The adhesive according to claim 1 in which the copolymerizing step (a) further includes up to 5 parts per hundred parts of acrylic and vinyl monomers of an N-substituted amide, a tertiary amine, or a lactam.

8. The adhesive according to claim 7 in which the copolymerizing step (a) of claim 1 further includes up to 5 parts per hundred parts of acrylic and vinyl monmers of N-vinyl formamide, N-vinyl pyrrolidone, or 4-vinyl pyridine.

* * * * *